(12) United States Patent
Dinu et al.

(10) Patent No.: US 10,156,945 B2
(45) Date of Patent: Dec. 18, 2018

(54) SUPPRESSION OF DISPLAY NOISE IN TOUCH SCREEN CONTROLLERS

(71) Applicant: STMicroelectronics Asia Pacific Pte Ltd, Singapore (SG)

(72) Inventors: Leonard Liviu Dinu, Singapore (SG); Chao Chao Zhang, Singapore (SG)

(73) Assignee: STMICROELECTRONICS ASIA PACIFIC PTE LTD, Singapore (SG)

( * ) Notice: Subject to any disclaimer, the term of this patent is extended or adjusted under 35 U.S.C. 154(b) by 360 days.

(21) Appl. No.: 14/936,166

(22) Filed: Nov. 9, 2015

(65) Prior Publication Data

US 2017/0131823 A1    May 11, 2017

(51) Int. Cl.
*G06F 3/041* (2006.01)
*G06F 3/044* (2006.01)

(52) U.S. Cl.
CPC ............ *G06F 3/044* (2013.01); *G06F 3/0418* (2013.01)

(58) Field of Classification Search
CPC ............................. G06F 3/0418; G06F 3/044
See application file for complete search history.

(56) References Cited

U.S. PATENT DOCUMENTS

| | | | |
|---|---|---|---|
| 2011/0163766 A1* | 7/2011 | Geaghan | G06F 3/044 324/678 |
| 2013/0057511 A1* | 3/2013 | Shepelev | G06F 3/044 345/174 |
| 2013/0063167 A1* | 3/2013 | Jonsson | G06F 3/0418 324/686 |
| 2013/0194229 A1* | 8/2013 | Sabo | G06F 3/044 345/174 |

* cited by examiner

*Primary Examiner* — Robert Michaud
(74) *Attorney, Agent, or Firm* — Crowe & Dunlevy

(57) ABSTRACT

An electronic device includes a touch screen controller. The touch screen controller is configured to asynchronously measure a capacitance between a sense line and a drive line of a sensing layer with respect to a horizontal sync signal of a display layer. In addition, the touch screen controller is also configured to disconnect from the sense line for a given period of time following a rising edge of the horizontal sync signal so as to reduce capacitive coupling of display noise from the horizontal sync signal to the sensing layer.

20 Claims, 3 Drawing Sheets

SUPPRESSION OF DISPLAY NOISE IN TOUCH SCREEN CONTROLLERS

BACKGROUND

Handheld electronic devices such as smartphones, tablets, and smartwatches are popular with consumers and are sold in great numbers. The majority of these devices employ a touch sensitive display for both display of output to a user and accepting data as input from a user. Most of these touch sensitive displays utilize capacitive touch sensing.

A typical such touch sensitive display includes a display layer constructed from technology such as LCD, IPS, or AMOLED, as well as a sensing layer. A typical sensing layer includes a plurality of parallel drive lines, and a plurality of parallel sense lines. The sense lines capacitively intersect the drive lines. In operation, a single drive line is driven with a wave, such as a square wave or sine wave. The capacitance between the sense lines and the driven drive line is sensed at the point where they intersect. Presence of a human finger or a conductive object alters the expected capacitance at the intersection point, and by measuring the change in capacitance, a touch between the finger or object and the touch sensitive display can be detected.

Consumer desires for these handheld electronic devices are for the devices to grow increasingly thin. This accordingly results in the desire to make touch sensitive displays increasingly thin. However, as such touch sensitive displays grow thinner, noise from the display layer becomes an increasing problem for the sensing layer, as the thinner designs result in greater parasitic capacitances coupling the noise from the display layer through to the sensing layer. This noise, when coupled through to the sensing layer, degrades accuracy of the touch sensing performed by the sensing layer, which is commercially undesirable.

Therefore, ways of decreasing the coupling of noise from the display layer through to the sensing layer are desirable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Disclosed herein is an electronic device including a touch screen controller. The touch screen controller is configured to asynchronously measure a capacitance between a sense line and a drive line of a sensing layer with respect to a horizontal sync signal of a display layer. In addition, the touch screen controller is also configured to disconnect from the sense line for a given period of time following a rising edge of the horizontal sync signal so as to reduce capacitive coupling of display noise from the horizontal sync signal to the sensing layer.

The given period of time may be sufficient for the display noise to fall to less than 10% of its peak value. In addition, the touch screen controller may include a switch for selectively decoupling the sense line from the touch screen controller during the given period of time. The touch screen controller may also include a digital block configured to generate a control signal for the switch that causes the switch to selectively open.

The digital block may be configured to generate the control signal as a series of pulses of equal duration, and to blank a portion of each pulse of the series that would overlap in time with the rising edge of the horizontal sync signal. The digital block may also be configured to blank at least one portion of each pulse of the series that would not overlap in time with the rising edge of the horizontal sync signal, such that a duration of each pulse of the series that would overlap in time with the rising edge of the horizontal sync signal is equal to a duration of each pulse that would not overlap in time with the rising edge of the horizontal sync signal.

The touch screen controller may have a driver to drive the drive line with a force signal for charging or discharging the capacitance between the sense line and the drive line, and the digital block may control the driver so as to blank the force signal if the force signal would overlap in time with a blanked portion of a pulse of the series of pulses. In addition, the touch screen controller may have a sense block coupled to the sense line via a switch, the sense block being configured to measure the capacitance between the sense line and the drive line and to output the capacitance to the digital block. The digital block may generate the control signal as a series of pulses, and the sense block may have an integrator coupled to the sense line via the switch and configured to integrate a signal on the sense line during a pulse of the series.

The sense block may also include an accumulator coupled to the integrator via first and second switched paths and configured to sum successive outputs of the integrator. The second switched path may invert outputs of the integrator. The series of pulses may be generated as pairs of first and second pulses. The digital block may control the first switched path to couple the integrator to the accumulator during the first pulses and controls the second switched path to couple the integrator to the accumulator during the second pulses.

The sense block may have an analog to digital converter coupled between the accumulator and the digital block and configured to convert analog outputs from the accumulator to digital inputs for the digital block.

DETAILED DESCRIPTION

The present description is made with reference to the accompanying drawings, in which example embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Figure 1:
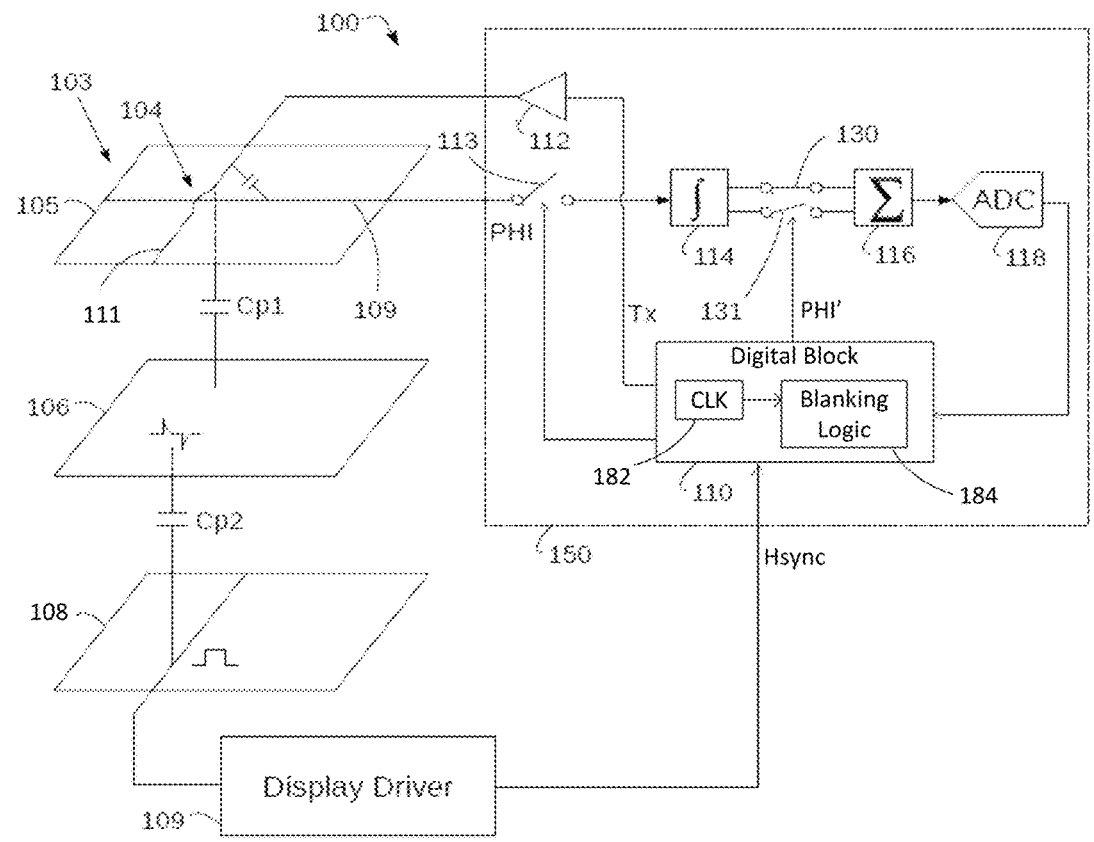
FIG. 1 is a detailed schematic block diagram of an electronic device in accordance with this disclosure.

With initial reference to FIG. 1 a touch sensitive display 100 for an electronic device is now described. The electronic device may be a smartphone, smartwatch, tablet, laptop, or other suitable portable electronic device. The touch sensitive display 100 includes a display layer 108 with a common voltage layer (VCOM) 106 thereon. A touch sensing layer 103 is over the VCOM layer 106. The touch sensing layer 103 is comprised of a touch layer substrate 105 having a touch sensor 104 formed thereon. The touch sensor 104 itself is formed by a capacitively intersecting sense line 109 and drive line 111. A touch is detected via measuring the capacitance between the sense line 109 and drive line 111. For simplicity, but one sense line 109 and one drive line 111 is shown, however it should be understood that there may be any number of sense lines and drive lines.

The VCOM layer 106 provides a common voltage, such as ground, to both the sensing layer 103 and the display layer 108. Due to this VCOM layer 106, as will be explained in detail below, a parasitic capacitance Cp1 is formed between the sensing layer 103 and the VCOM layer 106, and a parasitic capacitance Cp2 is formed between the VCOM layer 106 and the display layer 108. For simplicity, but two parasitic capacitances Cp1, Cp2 are shown, but it should be understood that there may be any number of parasitic capacitances formed between the sensing layer and the VCOM layer 106 and between the VCOM layer 106 and the display layer 108.

The display layer 108 contains rows and columns of pixels that are scanned so as to form an image for display to a user. The display layer 108 is coupled to a display driver 109 which controls the display layer 108 using a horizontal sync signal HSYNC, which is a pulse that synchronizes the start of scanning of a row.

In operation, the drive line 111 is driven with a periodic signal, such as a square wave. At the intersection point between the drive line 111 and sense line 109, the sense line 109 incurs a charge injection proportional to the voltage at the drive line 111 and a capacitance between the sense line 109 and the drive line 111 at that intersection point. This capacitance varies in proximity to conductive objects, such as human fingers, and is measured and processed by a touch screen controller 150 so as to generate touch data for use by the electronic device.

The inventors have found that, at each HSYNC pulse, noise is capacitively coupled from the display layer 108 into the VCOM layer 106 via the parasitic capacitance Cp2. Then, that noise is capacitively coupled from the VCOM layer 106 into the sensing layer 103 via the parasitic capacitance Cp1. This noise causes unwanted charge injection which degrades the accuracy and performance of the touch data generated by the touch screen controller 150.

Further details of the touch screen controller 150 and how the inventors have determined it may be operated so as to reduce or eliminate the effect of the noise on generated touch data will now be given. The touch screen controller 150 includes a digital block 110, which may be a programmed microprocessor, which is coupled to the display 109 driver to receive therefrom the HSYNC signal.

The touch screen controller 150 includes a driver 112 coupled to the drive line 111 and controlled by a drive (or "force") signal Tx from the digital block 110. A switch 113 is controlled by a first control signal PHI from the digital block 110 to selectively couple the sense line 109 to an integrator 114. The integrator 114 is coupled to an accumulator 116 via either a switch 130, or a switch 131, which are controlled by a second control signal PHI' from the digital block 110. The accumulator 116 is coupled to an analog to digital converter 118, which in turn is coupled to the digital block 110.

In operation, the digital block 110 generates the control signal PHI 110 as a series of pairs of pulses of equal duration, but blanks (pulls low) a portion of each pulse that would overlap in time with the rising edge of the horizontal sync signal HSYNC (and thus a noise spike) for a given period of time. The duration of given period of time is less than the width of an individual HSYNC pulse, and is timed such that the noise spike caused by the horizontal sync signal HSYNC has subsided by at least 90%, and in some cases 99%, before the blanking is removed. This disconnects the integrator 114 from the sense line 109 during the given period of time.

Figure 2:
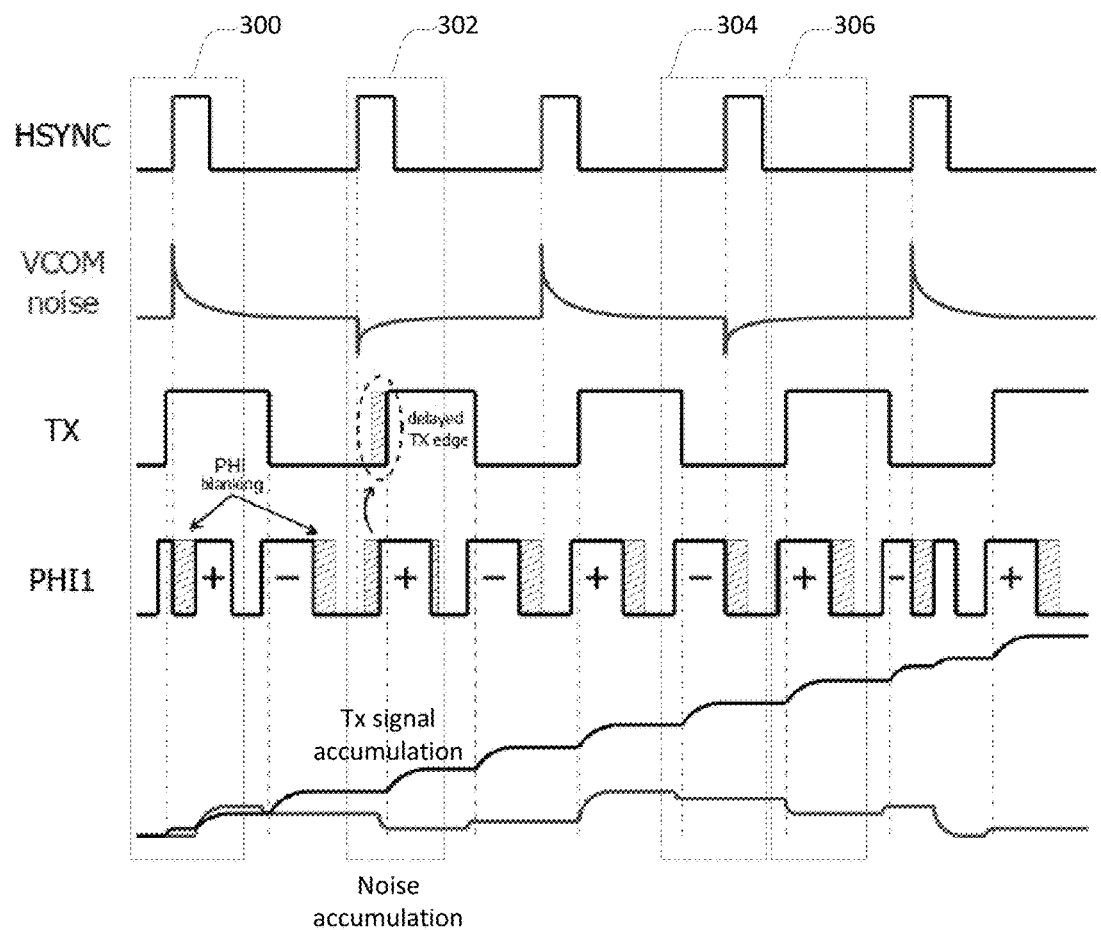
FIG. 2 is a timing diagram of signals of the electronic device of FIG. 1 during operation.

The digital block 110 also blanks at least one portion of each pulse that would not overlap in time with the rising edge of the horizontal sync signal HSYNC, such that a duration of each pulse in the control signal is equal. That is, the duration of each pulse that would overlap in time with the rising edge of the horizontal sync signal HSYNC is equal to a duration of each pulse that would not overlap in time with the rising edge of the horizontal sync signal HSYNC. The generated control signal PHI is shown in FIG. 2, with the hatched portions representing portions that have been blanked. In addition, the timing of the blanking of PHI relative to HSYNC, and the duration of PHI relative to the noise spikes, is evident from FIG. 2.

Since the switch 113 that couples the sense line 109 to the integrator 114 is controlled by the control signal PHI, the passing of signals from the sense line 109 to the integrator 114 is performed asynchronously with respect to the horizontal sync signal HSYNC (since PHI blanks at the rising edges of HSYNC). Therefore, the touch screen controller 150 can be said to asynchronously measure the capacitance between the sense line and the drive line with respect to the horizontal sync signal HSYNC.

In addition, since the switch 113 is controlled by the control signal PHI, it operates to disconnect the sense line 109 from the integrator 114 (and thus the touch screen controller 150) for the given period of time following the rising edge of the horizontal sync signal HSYNC.

The digital block 110 controls the driver 112 to cause the driver 112 to drive the drive signal Tx to the drive line 111. If the rising edge of the drive signal Tx would overlap in time with a blanked portion of the control signal PHI, then the digital block 110 blanks that portion of the drive signal Tx. This is done so that the rising edge of the drive signal Tx occurs while the sense line 109 is coupled to the integrator 114. As an alternative to this blanking of Tx, data collected during the associated pair of control signals PHI can be discarded. Also, in some applications, the blanking may be performed at each rising edge of the drive signal Tx.

Inspection of the timing diagram of FIG. 2 illustrates the results of the switch 113 being controlled by the control signal PHI. Since the sense line 109 is disconnected from the integrator 114 during 90%+ of the duration of each noise spike, there is a large reduction in the amount of noise from the horizontal sync signal HSYNC that is coupled through the VSYNC layer 106 and into the sensing layer 103.

Figure 3:
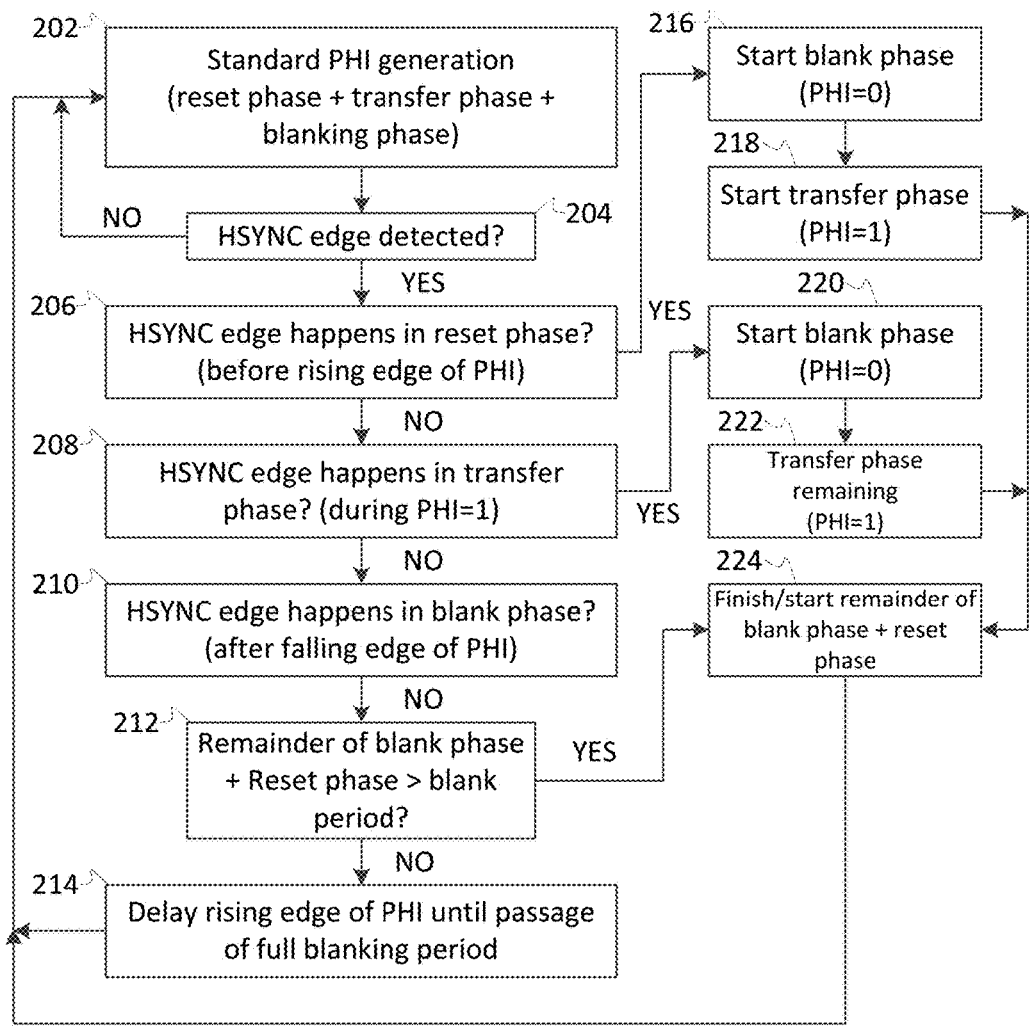
FIG. 3 is a flowchart showing generation of the PHI signals by the electronic device of FIG. 1 during operation.

Generation of the control signal PHI will now be described with reference to FIGS. 1-3. Generation of the control signal PHI is performed by the digital block 110, which includes a clock 182 feeding blanking logic 184. The blanking logic 184 receives the Hsync signal. The blanking logic 184 may be a microprocessor executing software, or may be a programmed logic device and therefore generation of the control signal PHI may be performed by discrete electrical components such as logic gates, amplifiers, and comparators.

PHI is generated by the blanking logic 184 as a periodic signal, with portions of its pulses being "blanked". Each period of PHI is either equal to a period of the clock 182, or equal to a multiple of the clock, for example 100 clock cycles. Each PHI period is comprised of three components: (1) a transfer phase during which PHI is high and during which the sense line 109 is coupled to the integrator 114, (2)

a blanking phase during which PHI would otherwise be high but is pulled low, and (3) a reset phase during which PHI is low without having to be pulled low. The total period or duration of a PHI cycle remains the same, as does the total time spent in each of the transfer phase, blanking phase, and reset phase. However, the blanking phase can change temporal position during each PHI cycle such that, while the phases have equal aggregate durations between each PHI cycle, the time within each PHI cycle at which each phase begins and ends may be different.

A "standard" PHI cycle, illustrated as 306 in FIG. 2, begins with a PHI going high and remaining high for a transfer period until the transfer phase is completed, continues with PHI being pulled low for a blanking period until the blanking phase is completed, and ends with PHI being low (without having to be pulled low) for a reset period until the cycle is completed. "Transfer period", "blanking period", and "reset period" are used here to mean the total duration of time to be spent in each of the transfer phase, blanking phase, and reset phase respectively.

The blanking logic 184 continues with generating standard PHI cycles (Block 202) while detecting HSYNC edges (Block 204). While no HSYNC edge is detected, the blanking logic 184 simply continues with generating standard PHI cycles (Block 202). When an HSYNC edge is detected, the blanking logic looks at which phase of the PHI cycle the HSYNC edge has been detected.

If the HSYNC edge has been detected during the reset phase (Block 206), shown in 302 of FIG. 2, then the blanking phase begins immediately (Block 216). Once the blanking phase is completed, the transfer phase then begins (Block 218).

If the HSYNC edge has been detected during the transfer phase (Block 208), shown in 300 of FIG. 2, then the blanking phase begins immediately (Block 220). Once the blanking phase is completed, the transfer phase is resumed until the total time in the transfer phase is equal to the full transfer period (Block 222). Here, the full transfer period may be considered to be the total time taken for a complete charge transfer.

If the HSYNC edge happens in the blank phase (Block 210), shown in 304 of FIG. 2, a check is performed to determine whether the remainder of the blank phase together with the reset phase equals a time period greater than a full blanking time period (Block 212). If the remainder of the blank phase plus the reset phase is greater than a time period equal to a full blanking time period, then the blanking phase is completed and the reset phase is begun (Block 224). If the remainder of the blank phase plus the reset phase is less than a time period equal to a full blanking time period, then the rising edge of PHI is delayed until passage of a time period equal to a full blanking period (Block 214).

Since the HSYNC edge has been dealt with, the blanking logic 184 thereafter returns to generation of a standard PHI period (Block 202).

The techniques described above provide for more robust performance of the touch sensitive display 100 and the generation of more accurate touch data. In addition, due to the asynchronous touch sensing with the display, additional time for making touch sensings is available, which can be used to increase accuracy. In addition, the risks associated with baseband shift and receiver saturation are eliminated.

Generation of the touch data will now be described. The integrator 114 integrates the signal on the sense line 109 during each period over which the switch 113 is closed. During a first pulse of the pairs of pulses (indicated with a "+" for the PHI signal shown in FIG. 2), the switch 130 closes (and the switch 131 opens) and the integrated signal is passed to the accumulator 116. During a second pulse of the pairs of pulses (indicated with a "−" for the PHI signal shown in FIG. 2), the switch 131 closes (and the switch 130 opens) and the integrated signal is inverted (complemented) and then passed to the accumulator 116.

The accumulator 116 sums the signals received from the integrator 114, and passes the sum to the analog to digital converter 118. The analog to digital converter converts the sum to the digital domain and passes it to the digital block 110.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

The invention claimed is:

1. An electronic device, comprising:
a touch screen controller configured to:
asynchronously measure a capacitance between a sense line and a drive line of a sensing layer with respect to a horizontal sync signal of a display layer;
disconnect from the sense line, using a switch, for a given period of time following a rising edge of the horizontal sync signal so as to reduce capacitive coupling of display noise from the horizontal sync signal to the sensing layer.

2. The electronic device of claim 1, wherein the given period of time is sufficient for the display noise to fall to less than 10% of its peak value.

3. The electronic device of claim 1, wherein the touch screen controller further comprises a digital block configured to generate a control signal for the switch that causes the switch to selectively open.

4. The electronic device of claim 3, wherein the digital block is configured to generate the control signal as a series of pulses of equal duration, and to blank a portion of each pulse of the series that would overlap in time with the rising edge of the horizontal sync signal.

5. The electronic device of claim 4, wherein the digital block is also configured to blank at least one portion of each pulse of the series that would not overlap in time with the rising edge of the horizontal sync signal, such that a duration of each pulse of the series that would overlap in time with the rising edge of the horizontal sync signal is equal to a duration of each pulse that would not overlap in time with the rising edge of the horizontal sync signal.

6. The electronic device of claim 4, wherein the touch screen controller comprises a driver to drive the drive line with a force signal for inducing the capacitance between the sense line and the drive line; wherein the digital block controls the driver so as to blank the force signal if the force signal would overlap in time with a blanked portion of a pulse of the series of pulses.

7. The electronic device of claim 3, wherein the touch screen controller comprises a sense block coupled to the sense line via the switch, the sense block configured to measure the capacitance between the sense line and the drive line and to output the capacitance to the digital block.

8. The electronic device of claim 7, wherein the digital block generates the control signal as a series of pulses; and wherein the sense block comprises an integrator coupled to the sense line via the switch and configured to integrate a signal on the sense line during a pulse of the series.

9. The electronic device of claim 8, wherein the sense block further comprises an accumulator coupled to the integrator via first and second switched paths and configured to sum successive outputs of the integrator; wherein the second switched path inverts outputs of the integrator; wherein the series of pulses is generated as pairs of first and second pulses; wherein the digital block controls the first switched path to couple the integrator to the accumulator during the first pulses and controls the second switched path to couple the integrator to the accumulator during the second pulses.

10. The electronic device of claim 9, wherein the sense block further comprises an analog to digital converter coupled between the accumulator and the digital block and configured to convert analog outputs from the accumulator to digital inputs for the digital block.

11. The electronic device of claim 1, wherein the touch screen controller comprises a driver to drive the drive line with a force signal for inducing the capacitance between the sense line and the drive line; and wherein the touch screen controller is further configured to disconnect from the sense line for a given period of time following a rising edge of the force signal so as to reduce capacitive coupling of display noise from the horizontal sync signal to the sensing layer.

12. An electronic device, comprising:
a display layer controlled by a horizontal sync signal and generating display noise based thereupon;
a sensing layer including a sense line capacitively intersecting a drive line;
a common voltage layer coupled to the display layer and the sensing layer, the common voltage layer capacitively coupling the display noise from the display layer to the sensing layer;
a touch screen controller configured to:
asynchronously measure a capacitance between the sense line and the drive line with respect to the horizontal sync signal;
disconnect from the sense line, using a switch, for a given period of time following a rising edge of the horizontal sync signal;
wherein the asynchronous measuring and the disconnecting results in a reduction of the capacitive coupling of the display noise to the sensing layer.

13. The electronic device of claim 12, wherein the given period of time is sufficient for the display noise to fall to less than 2% of its peak value.

14. The electronic device of claim 12, wherein the touch screen controller further comprises a digital block configured to generate a control signal for the switch that causes the switch to selectively open as a series of pulses of equal duration and to blank a portion of each pulse of the series that would overlap in time with the rising edge of the horizontal sync signal, as a function of the horizontal sync signal.

15. The electronic device of claim 14, wherein the digital block is also configured to blank at least one portion of each pulse of the series that would not overlap in time with the rising edge of the horizontal sync signal, such that a duration of each pulse of the series that would overlap in time with the rising edge of the horizontal sync signal is equal to a duration of each pulse that would not overlap in time with the rising edge of the horizontal sync signal.

16. A method, comprising:
asynchronously measuring a capacitance between a sense line and a drive line of a display layer with respect to a horizontal sync signal that controls a display layer, using a touch screen controller;
disconnecting the touch screen controller from the sense line, using a switch, for a given period of time following a rising edge of the horizontal sync signal; and
wherein the asynchronous measuring and the disconnecting results in a reduction of capacitive coupling of display noise from the display layer, resulting from the horizontal sync signal, to the sensing layer.

17. The method of claim 16, wherein the given period of time is sufficient for the display noise to fall to less than 10% of its peak value.

18. The method of claim 16, further comprising generating a control signal as a series of pulses of equal duration, and blanking a portion of each pulse of the series that would overlap in time with the rising edge of the horizontal sync signal, as a function of the horizontal sync signal; and wherein disconnecting the touch screen controller from the sense line comprises opening the switch that selectively couples the touch screen controller to the sense line as a function of the control signal.

19. The method of claim 18, further comprising blanking at least one portion of each pulse of the series or pulses that would not overlap in time with the rising edge of the horizontal sync signal, such that a duration of each pulse of the series of pulses that would overlap in time with the rising edge of the horizontal sync signal is equal to a duration of each pulse that would not overlap in time with the rising edge of the horizontal sync signal.

20. The method of claim 19, further comprising driving the drive line with a force signal for inducing the capacitance between the sense line and the drive line, and blanking the force signal if the force signal would overlap in time with a blanked portion of a pulse of the series of pulses.

* * * * *